United States Patent Office 3,222,282
Patented Dec. 7, 1965

3,222,282
MODERATELY CROSSLINKED POLYMERS AS HYDROCARBON OIL ADDITIVES
Edward B. Berkowitz, Brooklyn, N.Y., and William H. Stadtmiller, Colonia, and Leonard Berkowitz, Elizabeth, N.J., assignors to Esso Research and Engineering Company, a corporation of Delaware
No Drawing. Filed Dec. 27, 1962, Ser. No. 247,540
12 Claims. (Cl. 252—51.5)

The present invention concerns polymeric additives for hydrocarbon oils and it is particularly directed to additives of this nature that have been improved with respect to their ability to raise the viscosity index of lubricating oils to which they are added.

Through the years, there has been considerable interest in materials that can be added to lubricating oil compositions to improve their viscosity-temperature relationships. In many applications of lubricating oils and particularly when they are used as crankcase oils in piston-type internal combustion engines, it is desirable that they undergo relatively small changes in viscosity through the operating temperature of the engine, i.e. from the time that the engine is started cold until it has fully warmed up. The term "viscosity index" or "V.I." can be applied to express the relative viscosity change which an oil undergoes with changes in temperature. Specifically, the V.I. indicates the relation which the viscosity of a particular oil at 100° F. bears to the viscosities of a representative Pennsylvania oil and a representative Coastal oil at that temperature where all three of the oils have the same viscosity at 210° F. Usually the viscosity index is determined by the well-known Dean and Davis viscosity index relationship which is described in A.S.T.M. D-567.

As it is usually impossible or at least not practical to produce lubricating oils of sufficiently high viscosity index by ordinary refining methods, it has become the custom to add certain materials known as oil thickeners or V.I. improvers to the lubricating oil base stocks to improve their viscosity characteristics.

It has been well known for some time to employ various polymeric materials for imparting viscosity index improving as well as pour point depressing properties to lubricating oil compositions. In more recent work, it has been found desirable to modify such polymeric materials so that they will also function as sludge dispersants and detergent additives. High molecular weight polymers and copolymers of unsaturated organic compounds, particularly aliphatic esters of unsaturated monocarboxylic acids or unsaturated polycarboxylic acids or alkylene esters of fatty acids have been used extensively as additives having the multifunctional properties mentioned, that is, the properties of lowering the pour point, raising the viscosity index and improving the sludge dispersing properties. Such polymers include methacrylate esters, fumaric acid or maleic acid esters, vinyl acetate and the like.

In accordance with the present invention, it has been found that the viscosity index improving potency of the ester-type polymers and copolymers can be increased by including therein small proportions of crosslinking agents containing at least one allyl group.

These crosslinking agents are more particularly characterized as compounds containing one allyl group and at least one additional group selected from the class consisting of allyl groups and vinyl groups, with the proviso that no more than one vinyl group may be present and with the additional proviso that if no vinyl group is present, two additional allyl groups must be present.

For the purposes of the present invention allyl groups are defined as

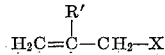

where R' is selected from the class consisting of hydrogen, methyl radical, and ethyl radical, and X is selected from the class consisting of an aromatic nucleus, a carbonyl group, and oxygen, nitrogen, sulfur, and phosphorus atoms.

Also, for the purposes of the present invention, vinyl groups are defined as unsaturated groups selected from the group consisting of unsaturated linkages in alpha, beta-unsaturated mono and polycarboxylic acids, including acrylic, methacrylic, ethacrylic, fumaric, maleic, itaconic, citraconic, crotonic, cinnamic, and orthocarboxy cinnamic acids; and groups defined by the formula

where R' and X have the same significance as in the allyl groups defined above.

The crosslinking agents of the invention include compounds containing one or more allyl groups and only one vinyl linkage, and compounds containing no vinyl linkages and two or more allyl linkages.

Compounds containing one vinyl linkage and at least one allyl group include the following.

A. Allylic esters of polycarboxylic alpha,beta-unsaturated acids. These may include acid esters or full esters, e.g.

Allyl acid fumarate or maleate,

HOOC—CH=CH—COOCH$_2$—CH=CH$_2$

Diallyl fumarate or maleate,

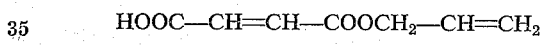
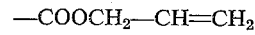

Allyl alkyl fumarates or maleates,

ROOC—CH=CH—COOCH$_2$—CH=CH$_2$ where R is an alkyl group of 1 to 20 carbon atoms.
Other examples are:

Methallyl butyl fumarate
Allyl C$_{13}$ oxo maleate
Methallyl acid maleate
Diallyl itaconate
Ethallyl monofumaramide (and N,N-dimethyl derivative)

B. Allylic esters of monocarboxylic alpha,beta-unsaturated acids:

Allyl acrylate
Allyl methacrylate
Methallyl acrylate
Allyl ethacrylate
Ethallyl methacrylate
Allyl crotonate C. Allyl vinyl esters of polycarboxylic acids:

Allyl vinyl adipate
Allyl isopropenyl succinate
Methallyl vinyl phthalate
Diallyl vinyl citrate, acetyl derivative D. Allyl vinyl acetals and ketals:

Methallyl vinyl ketal of methyl ethyl ketone
Allyl vinyl acetal of heptaldehyde

E. Allyl vinyl ethers and thioethers:

Methallyl vinyl ether

Allyl vinyl ether
Diallyl vinyl ether of resorcinol
Allyl isopropenyl ether
Allyl vinyl ether of diethylene glycol
Allyl vinyl thioether F. Allyl vinyl esters of inorganic acids:

Diallyl vinyl phosphite
Allyl vinyl butyl phosphate
Diallyl ester of vinyl phosphonic acid
Methallyl vinyl sulfate G. Allyl compounds with vinyl groups attached to nitrogen or phosphorus:

Diallyl vinyl phosphine
Methallyl vinyl octyl amine
N-allyl,N'-vinyl ethylene diamine
N-allyl,N-vinyl butyramide
N-allyl,N'-isopropenyl adipamide
N-vinyl allylpyrrolidine H. Allyl vinyl ketones:

Allyl vinyl ketone
Methallyl vinyl ketone
Allyl isopropenyl ketone

I. Allyl vinyl aromatic compounds:

p-Allyl styrene
p-Allyl alpha-methyl styrene
p-Methallyl styrene

Compounds containing three allyl groups and no vinyl groups include the following.

J. Allylic esters of polycarboxylic acids:

Acetyl triallyl citrate
Triallyl citrate

K. Allyl ethers:

Triallyl ether of resorcinol
Triallyl cyanurate

L. Allyl esters of inorganic acids:

Triallyl phosphite
Triallyl phosphate

M. Allyl groups attached to nitrogen or phosphorus:

Triallyl phosphate
Triallyl phosphine
Triallyl amine

N. Allyl groups on aromatic "nuclei": Triallyl benzene.

The allyl crosslinking agents of this invention may be employed in concentrations ranging from about 0.01 to about 5%, and preferably from about 0.05 to about 1.5 percent by weight, based on the total charge of monomers that are polymerized.

The polymers in which the crosslinking agents are employed are preferably those comprising $C_1$ to $C_{20}$ aliphatic esters, more preferably $C_6$ to $C_{18}$ esters, of alpha,beta-unsaturated monocarboxylic or polycarboxylic acids such as lauryl methacrylate, octadecyl methacrylate, octadecyl acrylate, dilauryl aconitate, hexyl citraconate, octadecyl maleate, octyl itaconate, lauryl fumarate, tallow alcohol fumarates, and the like, as well as copolymers with other polymerizable monomers, e.g. alkylene esters of short chain fatty acids such as vinyl acetate, allyl propionate, vinyl butyrate, isopropenyl acetate and the like, N-vinyl pyrrolidone, hydroxy alkyl acrylates such as hydroxyethyl methacrylate, hydroxypropyl acrylate, etc.

Other copolymers include those comprising the unsaturated esters of the types enumerated above along with unsaturated hydrocarbons such as isobutylene, hexene, decene, octadecene, styrene, and the like; unsaturated nitriles, as for example acrylonitrile, alkenyl alkyl ethers, such as vinyl hexyl ether, isopropenyl octyl ether, vinyl dodecyl ether, allyl isobutyl ether and the like; or anhydrides of unsaturated dibasic acids, as for example maleic anhydride.

The various types of monomers used in making polymers that are modified with the crosslinking agents of the invention may be classified for convenience as Group A monomers, which include the aliphatic esters of unsaturated carboxylic acids mentioned above, e.g. the maleates, fumarates, acrylates, methacrylates, itaconates, citraconates, etc.; Group B monomers, i.e. the alkylene esters of short chain fatty acids such as vinyl acetate; and Group C monomers, including vinyl and allyl alkyl ethers, dibasic acid anhydrides, N-vinyl pyrrolidone, acrylonitrile, hydroxy alkyl acrylates, unsaturated hydrocarbons, and so on.

In addition to polymers of Group A monomers, this invention contemplates copolymers of Group A monomers with Group B monomers and/or Group C monomers, wherein from about 1 up to 50 mole percent of Group B monomers and from about 1 up to 10 mole percent of Group C monomers are present.

The allyl crosslinking agents of this invention are particularly applicable for improving the viscosity index properties of terpolymers prepared from two types of unsaturated esters, one ester being an ester of a $C_8$ to $C_{20}$ aliphatic alcohol and an alpha,beta-unsaturated dicarboxylic acid and the other ester being an alkylene ester of a short chain fatty acid, the third component of the terpolymer being either an anhydride of an unsaturated dibasic acid, particularly maleic anhydride, or a hydroxyalkyl acrylate. The preferred alpha,beta-unsaturated dicarboxylic acid is fumaric acid although maleic acid or itaconic acid may be used. The alkylene esters include vinyl, isopropenyl and allyl esters of acetic, propionic and butyric acids. The hydroxyalkyl acrylates may be represented by the formula,

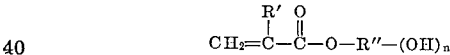

wherein R' is selected from the group consisting of hydrogen, methyl, and ethyl radicals, R'' is an alkylene hydrocarbon group of from 2 to 6 carbon atoms, and $n$ is an integer of from 1 to 5. Specific examples of such compounds include hydroxyamyl acrylate, hydroxyethyl ethacrylate, hydroxypropyl methacrylate, hydroxethyl methacrylate, and 2,3-dihydroxypropyl methacrylate.

Molar proportions of the monomers employed in preparing terpolymers of the type mentioned above are set forth below:

|  | Mole Percent in Terpolymer | |
| --- | --- | --- |
|  | Broad Range | Preferred Range |
| Aliphatic ester of alpha,beta-unsaturated dicarboxylic acid | 15–50 | 20–30 |
| Alkylene ester of short chain fatty acid | 50–85 | 70–80 |
| Dicarboxylic acid anhydride or hydroxyalkyl acrylate | 1–10 | 2–5 |

Specific examples of aliphatic alcohol esters of alpha, beta-unsaturated dicarboxylic acids that may be employed in such terpolymers include octyl itaconate, octyldecyl maleate, lauryl fumarate, lauryl maleate, tallow fumarates or maleates, and $C_8$ or $C_{13}$ oxo alcohol fumarate or maleate. Esters of glycol monoalkyl ethers and fumaric, maleic or itaconic acids may also be used, such as Cellosolve fumarate (glycol monoethyl ether fumarate).

By tallow fumarates or maleates is meant the esters of fumaric or maleic acid and the alcohols derived from tallow by hydrogenation and/or by sodium reduction. The tallow alcohols are principally $C_{16}$ to $C_{18}$ alcohols, with minor amounts of $C_{12}$ to $C_{14}$ and $C_{20}$ alcohols. The oxo alcohols are well known in the art and are ordinarily prepared from olefins by reaction with carbon monoxide and hydrogen in the presence of a suitable catalyst, as for example a cobalt carbonyl. The reaction products are primarily aldehydes having one more carbon atom than the starting olefins. These aldehydes are then hydrogenated in a separate catalytic stage to convert them to the corresponding alcohols. The preferred dicarboxylic acid anhydride, when such is used in the terpolymer, is maleic anhydride. Other anhydrides that may be used include itaconic and citraconic.

The polymers and copolymers of this invention may be prepared by any well-known polymerization process including low temperature Friedel Crafts polymerization, ionic polymerization processes or radiation polymerization processes. Peroxide type catalysts and other free radical catalysts are particularly useful. These include benzoyl peroxide, acetyl peroxide, urea peroxide, and tertiary butyl perbenzoate. These catalysts may be employed in concentrations in the range of from about 0.01 to about 2 wt. percent. The polymerization may be carried out in a suitable solvent in order to control reaction velocity and molecular weight. Oxygen may be excluded during the polymerization by the use of a blanket of an inert gas such as nitrogen or carbon dioxide. The suitable solvents for controlling the reaction include benzene, heptane, and mineral oil. Polymerization temperatures may range from about 100° F. to about 230° F. and reaction time may vary from about 2 to 10 hours.

The final polymers may have molecular weights in the range of from about 5,000 to about 1,000,000. The molecular weight can be determined by measuring the viscosity of solutions containing 5 milligrams of the polymer per cc. in diisobutylene and then applying the Staudinger equation. Particularly preferred when the polymers are primarily intended as V.I. improvers are molecular weights of about 50,000 to about 1,000,000. Polymers having multifunctional properties, i.e. detergent or dispersant properties as well as viscosity index improving properties may range in molecular weight from about 5,000 to 1,000,000.

Upon completion of the polymerization reaction the polymer may be freed of solvent and then employed as an additive for lubricating oils or fuel oils. For convenience in blending at the termination of the polymerization reaction, the polymer may be diluted with a light mineral oil and then stripped of solvent and unconverted monomers to give a concentrate of the polymer.

For use as lubricating oil additives, the polymers are incorporated in lubricating oil compositions in concentration ranges of from about 0.1 to about 10 wt. percent. The lubricating oils to which the additive of the invention may be added include not only mineral lubricating oils but various synthetic oils. The mineral lubricating oils may be of any preferred types including those derived from the ordinary paraffinic, naphthenic, asphaltic or of mixed base mineral crude oils by suitable refining methods. The synthetic oils may be hydrocarbon oils or they may be oils of the ester type, as for example di-2-ethylhexyl sebacate or the like.

The polymers of the invention may also be employed in middle distillate fuels for inhibiting the formation of sludge and sediment in such fuels or for improving the pour point characteristics. When so employed in fuels, they will be used in concentrations of from about 0.002 to about 2 wt. percent, preferably from about 0.005 to about 0.1 wt. percent. Petroleum distillate fuels boiling in the range of from about 300° F. to about 900° F. are contemplated. Typical of such fuels are No. 1 and No. 2 fuel oils that meet ASTM specification D-396-48T, diesel fuels qualifying as Grades 1D, 2D and 4D of ASTM specification D-975-51T, and various jet engine fuels.

In either the fuel or lubricant compositions, other conventional additives may also be present including dyes, antioxidants, dispersants, antiwear agents and the like.

The following examples serve to illustrate the manner in which the present invention may be practiced and the advantages accruing from the practice of the invention.

EXAMPLE 1

Several batches of terpolymers comprising fumarate esters, vinyl acetate and maleic anhydride were prepared using the following proportions. The total fumarate charge averaged 420 molecular weight.

|  | Wt. Percent of Total Monomers |
|---|---|
| Tallow fumarate, 76.7 grams | 14.2 |
| $C_8$ oxo alcohol fumarate, 156.7 grams | 29.0 |
| $C_{13}$ oxo alcohol fumarate, 100.0 grams | 18.6 |
| Vinyl acetate, 195.5 grams | 36.2 |
| Maleic anhydride, 10.8 grams | 2.0 |
| Tert. butyl perbenzoate, 2.2 ml. | |
| Mineral oil diluent, 95 grams (approximate; variable). | |

The batches differed from each other in that from 0.07 to 0.36 wt. percent (based on total monomers charged) of diallyl maleate was used in the separate batches, and for comparison one batch was prepared without the added diallyl maleate.

The general procedure employed in preparing the terpolymers is described as follows.

The fumarate esters and mineral oil diluent (a white oil identified as Bayol 85) are charged to a 2 liter flask and heated, with nitrogen atmosphere, until solution is effected. A solution of the vinyl acetate, maleic anhydride and tert. butyl perbenzoate, which had been purged with nitrogen, is then added and the reaction mixture is heated, with stirring, to reflux. Additional white oil may be added to control the viscosity. When the fumarate esters virtually disappear (as determined by polarographic analysis), the reaction mixture is then diluted with a solvent neutral mineral oil (viscosity of 150 SUS at 100° F.) and the excess vinyl acetate is removed by heating at 175–210° F. while purging with nitrogen. The resulting polymer concentrate contains approximately 35–40 wt. percent polymer. The concentrate is then blended in a base oil to the desired polymer content. The base oil consists of about 60 wt. percent of a solvent neutral mineral oil of 100 SUS viscosity at 100° F., about 35 wt. percent of a solvent refined naphthenic mineral oil of 400 SUS viscosity at 100° F. and about 5 wt. percent of commercial antiwear and detergent additive concentrates. The viscosities and viscosity indices of the blends are then obtained, the V.I.'s being calculated by the well-known Dean and Davis method.

The polymer concentrate obtained from each of the preparation batches was tested for its viscosity index improving properties by blending each concentrate in a base oil as described above and determining the viscosities and viscosity indices of the base oil and of each of the blends. The base oil had a viscosity at 210° F. of 47.5 SSU and a V.I. of 112.5. Each blend contained 2.8 wt. percent of polymer. The results obtained are shown in Table I.

*Table I*

| Amount of Diallyl Maleate, wt. percent [1] | Viscosity at 210° F., SSU | Viscosity Index |
|---|---|---|
| None | 64.0 | 137.2 |
| 0.07 | 65.5 | 138.1 |
| 0.14 | 66.1 | 138.9 |
| 0.21 | 67.2 | 139.1 |
| 0.28 | 69.6 | 140.7 |
| 0.36 | 71.9 | 142.8 |

[1] Based on total monomers charged.

EXAMPLE 2

An ester of methacrylic acid and coconut oil alcohols is employed in a copolymer modified in accordance with the present invention as follows. The coconut oil alcohols are available under the trade name Lorol and are principally lauryl alcohol (12 carbon atoms) with minor amounts of $C_{10}$ and $C_{14}$–$C_{18}$ alcohols. A mixture of 65 parts by weight of Lorol methacrylate, 25 parts by weight of n-butyl acrylate, 10 parts by weight of N-vinyl pyrrolidone, 0.3 part by weight of diallyl maleate, and 0.08 part of benzoyl peroxide is added to 20 parts of mineral oil and reacted for 8 to 9 hours at about 210° F., an additional 0.1 part of benzoyl peroxide being added in increments of 0.01 to 0.02 part by weight at 1 to 2 hour intervals during the course of the reaction, and an additional 30 parts of mineral oil being added after 6 to 7 hours' reaction time. The blend of copolymer and mineral oil is then stripped under vacuum at about 280–300° F. and mixed with additional mineral oil to give a 30 wt. percent concentrate. The copolymer is used in 2 wt. percent concentration to raise the viscosity index of a solvent extracted mineral lubricating oil having an initial V.I. of 111.9 and an initial viscosity of 47.2 SSU at 210° F.

EXAMPLE 3

Acetyl triallyl citrate was employed as a modifier for a terpolymer made from the monomers listed below:

|  | Wt. percent of total monomers |
|---|---|
| Tallow fumarate, 123.5 grams | 23.3 |
| $C_8$ oxo fumarate, 201.0 grams | 37.9 |
| Vinyl acetate, 195.5 grams | 36.8 |
| Maleic anhydride, 10.8 grams | 2.0 |
| Tert. butyl perbenzoate, 2.2 ml. | |
| Mineral oil diluent, 111 grams (approximate; variable). | |

One batch of the terpolymer was made without modification with acetyl triallyl citrate and two other batches were modified with 0.58 and 1.16 weight percent of the crosslinking agent (weight percentages are based on the total amount of monomers in the terpolymer). The general procedure followed in preparing the terpolymer was the same as is outlined in Example 1.

In the manner of the previous examples, the modified and unmodified terpolymers were evaluated for their viscosity index improving properties. The results obtained are shown in Table II. The base oil was the same as in Example 1, and the polymer concentration in each blend was 1.53 weight percent.

Table II

| Amount of Acetyl Triallyl Citrate, wt. percent [1] | Viscosity at 210° F. SSU | Viscosity Index |
|---|---|---|
| None | 54.2 | 131.0 |
| 0.58 | 59.0 | 136.4 |
| 1.16 | 62.3 | 140.7 |

[1] Based on total monomers charged.

EXAMPLE 4

The terpolymer preparation of Example 3 was repeated but employing, instead of acetyl triallyl citrate as the modifier, diallyl maleate in one case and diallyl fumarate in another. While the types and proportions of fumarate esters were the same as in Example 3, they were obtained from different batches of material in the present example. The method of preparation was not changed, however. The modified and unmodified terpolymers were evaluated for viscosity index improving properties in the same manner as in the previous examples, using the same base oil as in Example 1, and a polymer concentration of 1.53 wt. percent. The results, given in Table III, indicate that diallyl fumarate was somewhat more effective as a modifier than diallyl maleate, in this particular terpolymer.

Table III

| Modifier Used | Wt. Percent of Modifier [1] | Viscosity at 210° F. SSU | Viscosity Index |
|---|---|---|---|
| None | | 56.3 | 133.5 |
| Diallyl Maleate | 0.35 | 62.2 | 140.9 |
| Diallyl Fumarate | 0.12 | 63.9 | 141.7 |

[1] Based on total monomers charged.

EXAMPLE 5

Employing the general procedure of Example 1, terpolymers were prepared in which the maleic anhydride component was omitted and hydroxyethyl methacrylate was substituted. The batches differed from each other in that on diallyl maleate was employed as modifier, in a second triallyl cyanurate was employed, and in a third no modifier was used. The terpolymers were prepared with the following proportions of monomers:

|  | Grams |
|---|---|
| Tallow fumarate | 56.6 |
| $C_8$ oxo fumarate | 110.9 |
| Vinyl acetate | 101.0 |
| Hydroxyethyl methacrylate | 7.2 |
| Mineral oil diluent | 41.4 |

The polymers were evaluated for viscosity index improving properties in 2 wt. percent concentration in the same base oil as in Example 1. The results are given in Table IV.

Table IV

| Modifier Used | Wt. Percent of Modifier [1] | Viscosity at 210° F. SSU | Viscosity Index |
|---|---|---|---|
| None | | 60.3 | 137.1 |
| Diallyl maleate | 0.21 | 64.4 | 140.9 |
| Triallyl cyanurate | 0.21 | 64.4 | 141.1 |

[1] Based on total monomers charged.

It is to be understood that the examples presented in the foregoing specification are merely illustrative of this invention and are not intended to limit it in any manner; nor is the invention to be limited by any theory regarding its operability. The scope of the invention is to be determined by the appended claims.

What is claimed is:

1. An improved oil-soluble polymeric additive for hydrocarbon oils comprising the copolymerization product of from 15 to 50 mole percent of an ester of a $C_8$ to $C_{20}$ aliphatic alcohol and a $C_4$ to $C_5$ alpha,beta-unsaturated dicarboxylic acid, from 50 to 85 mole percent of a $C_2$ to $C_3$ alkylene ester of a $C_1$ to $C_4$ fatty acid, and from 1 to 10 mole percent of a monomer selected from the group consisting of anhydrides of $C_4$ to $C_5$ unsaturated dibasic acids, and hydroxyalkyl acrylates of the formula:

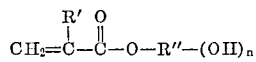

wherein R′ is selected from the group consisting of hydrogen, methyl, and ethyl radicals, R″ is an alkylene hydrocarbon group of from 2 to 6 carbon atoms, and $n$ is an integer of from 1 to 5, said copolymerization product having been modified by incorporating therein, prior to copolymerization, from 0.01 to about 5 weight percent, based on the total quantity of polymerizing monomers, of an allyl compound containing one allyl group and at least one additional group from the class consisting of allyl groups and vinyl groups, with the proviso that not more than one vinyl group is present, and with the additional proviso that if no vinyl group is present, there are two additional allyl groups.

2. An improved hydrocarbon composition comprising a major proportion of a hydrocarbon oil to which has been added from about 0.002 to about 10 wt. percent of a polymeric additive as defined by claim 1.

3. Polymeric additive as defined by claim 1 wherein said dicarboxylic acid is fumaric acid.

4. Polymeric additive as defined by claim 1 wherein said polymerization product comprises a copolymer of an alkyl fumarate, vinyl acetate, and hydroxyethyl methacrylate.

5. Polymeric additive as defined by claim 1 wherein said allyl compound comprises an allyl ester of a $C_3$ to $C_5$ carboxylic alpha,beta-unsaturated acid.

6. Polymeric additive as defined by claim 1 wherein said allyl compound comprises a polyallyl ester of a polycarboxylic $C_4$ to $C_8$ acid.

7. Polymeric additive as defined by claim 1 wherein said polymerization product comprises a copolymer of an alkyl fumarate, vinyl acetate and maleic anhydride.

8. Polymeric additive as defined by claim 1 wherein said allyl compound is diallyl maleate.

9. Polymeric additive as defined by claim 1 wherein said allyl compound is diallyl fumarate.

10. Polymeric additive as defined by claim 1 wherein said allyl compound is acetyl triallyl citrate.

11. Polymeric additive as defined by claim 1 wherein said allyl compound is triallyl cyanurate.

12. A polymeric additive as defined by claim 1, wherein said polymerization product comprises a copolymer of from 15 to 50 mole percent of mixed $C_8$ aliphatic fumarates and tallow alcohol fumarates, from 50 to 85 mole percent of vinyl acetate and from 1 to 10 mole percent of maleic anhydride.

References Cited by the Examiner

UNITED STATES PATENTS

| | | | |
|---|---|---|---|
| 2,295,924 | 9/1942 | Barnes | 260—89.5 |
| 2,298,066 | 10/1942 | Patnode | 260—89.5 X |
| 2,361,055 | 10/1944 | Pollack | 260—89.5 |
| 2,413,973 | 1/1947 | Howk et al. | 260—89.5 |
| 2,616,852 | 11/1952 | Giammaria | 252—56 |
| 2,655,479 | 10/1953 | Munday et al. | 252—56 |
| 2,704,277 | 3/1955 | Giammaria | 252—56 |
| 2,891,991 | 6/1959 | Stewart et al. | 252—56 X |
| 3,087,893 | 4/1963 | Agius et al. | 252—56 |

OTHER REFERENCES

"Monomer-Polymer Price List," Jan. 1, 1958, The Borden Co. Chemical Div., Philadelphia 24, Pennsylvania.

DANIEL E. WYMAN, *Primary Examiner.*

JOSEPH R. LIBERMAN, *Examiner.*